US008245020B1

(12) United States Patent
Gupta (10) Patent No.: US 8,245,020 B1
(45) Date of Patent: Aug. 14, 2012

(54) CREATING A PARTIAL INSTANCE OF COMPONENT IN RESPONSE TO USER SPECIFYING A VALUE FOR A DYNAMIC ATTRIBUTE OF A SELECTED COMPONENT

(75) Inventor: Pravil Gupta, Mountain View, CA (US)

(73) Assignee: Selectica, Inc., San Jose, CA (US)

( * ) Notice: Subject to any disclaimer, the term of this patent is extended or adjusted under 35 U.S.C. 154(b) by 458 days.

(21) Appl. No.: 12/454,077

(22) Filed: May 12, 2009

Related U.S. Application Data

(60) Provisional application No. 61/127,456, filed on May 13, 2008.

(51) Int. Cl.
*G06F 15/177* (2006.01)
*G06F 9/44* (2006.01)

(52) U.S. Cl. ............ 713/1; 717/100; 717/107; 717/108; 717/111; 717/157

(58) Field of Classification Search ...... 713/1; 717/100, 717/107, 108, 111, 157
See application file for complete search history.

(56) References Cited

U.S. PATENT DOCUMENTS

| | | | | |
|---|---|---|---|---|
| 7,720,794 | B2 * | 5/2010 | Wood | 707/796 |
| 2003/0204527 | A1 * | 10/2003 | Callahan | 707/104.1 |
| 2007/0094641 | A1 * | 4/2007 | Darr et al. | 717/121 |
| 2007/0168391 | A1 * | 7/2007 | Coschigano et al. | 707/104.1 |
| 2007/0168965 | A1 * | 7/2007 | Zenz et al. | 717/121 |
| 2009/0070073 | A1 * | 3/2009 | Wood | 703/1 |
| 2009/0089174 | A1 * | 4/2009 | Brunner et al. | 705/26 |
| 2011/0161054 | A1 * | 6/2011 | Woolf et al. | 703/1 |

OTHER PUBLICATIONS

Hannu Peltonen et al. "Product Configurations—An application for prototype object approach." Object-oriented programming, M. Tokoro and R Pareschi (eds.), Proc. of the 8th ECOOP conference, lecture notes in computer science 821, Springer-Verlag, pp. 513-534, 1994 ("Peltonen").*

* cited by examiner

*Primary Examiner* — Vincent Tran
(74) *Attorney, Agent, or Firm* — Tina M. Lessani; Lessani Law Group, PC (57) ABSTRACT

The present invention provides a configuration system, method, and software program for efficiently configuring products with dynamic components. Component definitions in the configuration system can include both static and dynamic attributes. Static attributes are fixed and are defined prior to the user configuring a product. Dynamic attributes are defined during a configuration session, and the values of dynamic attributes are unique to a configuration session. When an attribute of a dynamic component is specified or changed during the configuration process, the configurator creates only a partial instance of the component with the specified dynamic attribute, and it associates a state of the configuration process with such partial instance. When the configurator executes a constraint that involves a component with one or more dynamic attributes, the configurator uses, for each dynamic attribute, the most recent partial instance of the component with a value for that attribute.

19 Claims, 9 Drawing Sheets

| Component Name | Size (static) | Interface type (static) | Quantity (dynamic) | Price (dynamic) | Slot Number (dynamic, instance-specific) |
|---|---|---|---|---|---|
| HDD A | 300 | IDE | | | |
| HDD B | 500 | SATA | | | |
| HDD C | 500 | SATA | | | |

FIG. 5a

| Component Name | Size (static) | Interface type (static) | Quantity (dynamic) | Price (dynamic) | Slot Number (dynamic, instance-specific) |
|---|---|---|---|---|---|
| HDD A | 300 | IDE | 3 | 100 | Instance: 1, 2, 3 / Value: 0, 1, 2 |
| HDD B | 500 | SATA | | | |
| HDD C | 500 | SATA | | | |

United States Patent

CREATING A PARTIAL INSTANCE OF COMPONENT IN RESPONSE TO USER SPECIFYING A VALUE FOR A DYNAMIC ATTRIBUTE OF A SELECTED COMPONENT

RELATED APPLICATIONS

This application claims the benefit of U.S. Provisional Application No. 61/127,456 filed on May 13, 2008 with inventors Pravil Gupta and Stephan G. Sorger and titled "System and Method for Configuring Products," the contents of which are incorporated by reference herein as if fully disclosed herein

BACKGROUND OF THE INVENTION

1. Field of the Invention

This invention relates generally to configuration systems, and, more particularly, to configuring products with dynamic components.

2. Description of the Background Art

Product configurators are well known in the art. Product configurators are used by companies that sell configurable products and services. The configurator executes a configuration application that guides a user (e.g., a customer) through the configuration process. During a typical configuration process, a user selects components of a product/service, and the configurator determines whether the user's selection(s) violate any constraints associated with the configured product/service. If a constraint is violated, the user must make new selection(s).

Components of a configurable product can have static and/or dynamic attributes. Static attributes are pre-defined and do not change during the configuration process. Dynamic attributes are attributes that are defined by a user or the configurator during the configuration process.

In known systems, configuring products with components having dynamic attributes is very cumbersome and expensive. In some cases, this is because the configurators do not provide support for dynamic component (i.e., they do not allow the component definition to be changed during configuration), and, instead use a tracking parameter or other data objects to track dynamic aspects of the configuration outside the component definition. In other cases, the systems have component-like objects that support dynamic attributes, but such objects do not maintain a configuration state or otherwise have an association with a configuration state. Consequently, every time a dynamic attribute changes, an instance of the entire object needs to be recreated, and the configurator needs to repeat all previous computations in the configuration session that involved such object. Therefore, there is a need for a more efficient and cost-effective method for configuring products with dynamic components.

SUMMARY OF THE INVENTION

The present invention provides a configuration system, method, and software program for efficiently configuring products using dynamic components (i.e., parts). For avoidance of doubt, the term "products" as used herein includes not only physical products, but also services. Also, the term "developer" as used herein may be the developer of the configuration system, a product modeler that models a product on behalf of a company, or an IT professional that writes business constraints and component definitions for a configurator.

In the present invention, the developer creates a model for the product that includes component definitions that can have both (or either) static attributes and dynamic attributes. The developer specifies the static attributes before any configuration of the product by a user (i.e., a purchaser of the product). Static attributes are shared across configuration sessions.

During a configuration session, dynamic attributes are specified by either (1) the user or (2) the configurator in response to a user selection (e.g., the configurator calculates the price of a component after a user inputs a quantity for the component).

According to one embodiment of the present invention, the configurator does not recreate a whole instance a dynamic component every time a value of a dynamic attribute is specified. Instead, when the value of an attribute of a dynamic component is specified or changed during the configuration process, the configurator creates only a partial instance of the component with the value for the specified dynamic attribute, and it associates a state of the configuration process with such partial instance. For all other unmodified dynamic values previously specified, the configurator refers to the partial instances of the component having such values and associated with earlier states of the configuration process. When the configurator executes a constraint that involves a component with one or more dynamic attributes, the configurator uses, for each dynamic attribute, the most recent partial instance of the component with a value for that attribute. For static attributes, the configurator refers to the initial instance of the component with the values of the static attributes.

The foregoing method provides for a more efficient and cost-effective way to configure products with dynamic components because, (i) in the product model, all the component attributes, including dynamic attributes, can be modeled directly in the component, (ii) when a dynamic attribute changes, the configurator need only re-compute those attributes (if any) that are necessarily affected by the change, and (iii) the partial instances that capture dynamic attributes results in a memory-efficient implementation.

In a further embodiment of the invention, the configurator provides inherent support for dynamic properties like quantity which have direct impact on specially-marked properties like power, cost etc. In yet a further embodiment of the invention, the configurator also supports an array of values for a dynamic property in the event a quantity is specified for a component and each instance of that component has a different value for its dynamic property.

DETAILED DESCRIPTION OF THE PREFERRED EMBODIMENTS

Figure 1:
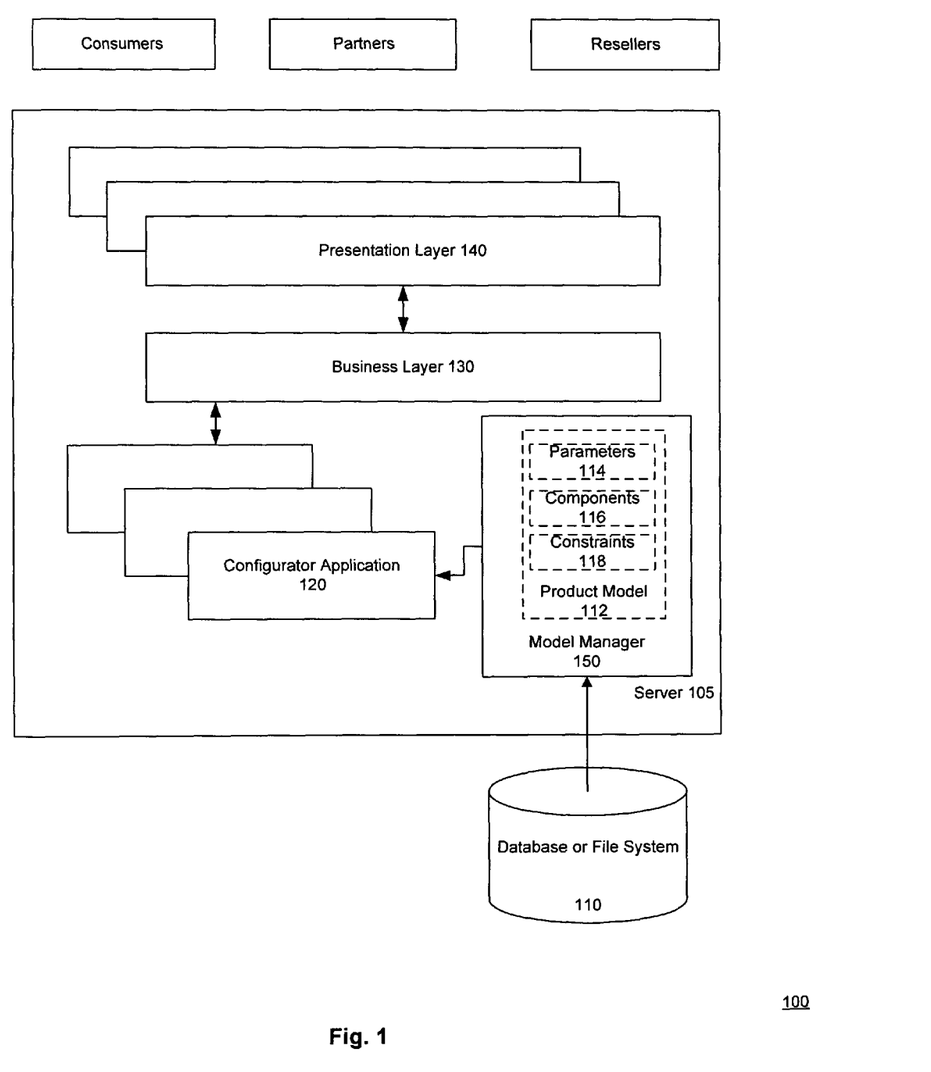
FIG. 1 is a block diagram that illustrates an example of a configuration system.

FIG. 1 illustrates an example of a configuration system. The configuration system 100 includes a server 105 and a database/file system 110.

Database or file system 110 stores the product data for products that can be configured via configuration system 100. The product data in database or file system 110 is used to generate product model objects for products. In one embodiment, the product data in database or file system 110 includes the product models in text form (as opposed to object form).

The primary elements of a product model 112 are:

Parameters (114): These are the product options (including service product options) that a user can select.

Components (116): Product parts (including service product parts) are represented as "components."

Constraints (includes rules) (118): The permissible relationships between parameters, as well as between parameters and components, are captured as constraints. Constraints include configuration rules.

Server 105 includes (and executes) a configuarator application 120, a business layer application 130, a presentation application 140, and a product model manager 150.

The configuarator application 120 guides a user (e.g., a customer) through a product configuration in accordance with a product model. Product model manager 150 holds the product models used by configuarator application 120. When required, the product model manager 150 retrieves product data, such as, for example, product model information in text format, from database or file system 110 and generates a product model object 112 from the data.

The configuarator application 120 operates as a product configuarator (or configuration engine) when executed by server 105. During a configuration session, the configuarator 120 presents (via the presentation layer 140) the user with parameters for a product, and the user makes parameter selections. The configuarator 120 reacts to each of the user's selections by executing all applicable constraints in the product model. If the user's selection violates a constraint, the configuarator 120 rejects the user's selection and prompts the user for a new selection. If the user's selection is acceptable, the configuarator 120 creates a new state of configuration, and waits for the user's next selection.

The presentation application 140 provides a client user interface for the user. The client user interface may be a browser-based application or a desktop application. The business layer 130 translates data from the configuarator application into a format compatible with the presentation layer 140, and vice versa. Also, any third party data that is used in the presentation layer (e.g., data from a CRM system) may be integrated into the configuration system 100 at business layer 130.

An example of a configuration system like configuration system 100 is the Selectica® Configurator (also known as the Selectica® Configuration Platform).

Those skilled in the art will appreciate that there are other ways to implement a configuration system, and the invention is in no way limited to the example system illustrated in FIG. 1.

Figure 2:
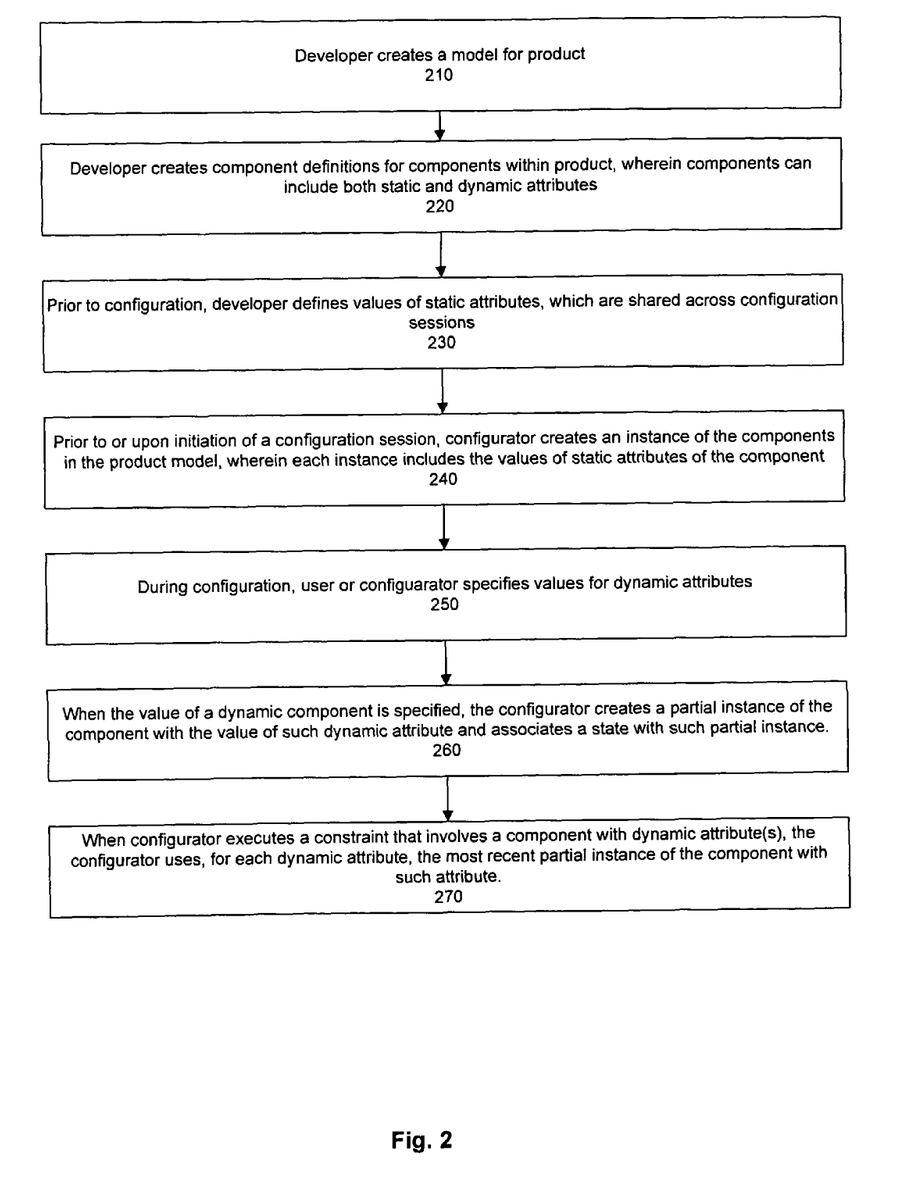
FIG. 2 is a flowchart that illustrates a method for configuring a product with dynamic components.

FIG. 2 illustrates a method, in a configuration system, for configuring a product using dynamic components. A developer of the configuration system creates a model for the product that will configured by the configuration system (step 210). As part of the product model development, the developer creates component definitions for components within the product (step 220). The component definitions can include both static attributes and dynamic attributes. A method for creating a component definition is described in more detail with respect to FIG. 4.

The developer defines the values of static attributes prior to a user configuring the product (step 230). The values of static attributes are shared across configuration sessions.

When the user initiates a configuration session, the configurator creates an instance of the components in the product model, wherein each instance includes the values of any static attributes of the component (step 240).

During the configuration session, the values of dynamic attributes are specified by either (i) the user or (ii) the configurator in response to a user selection (e.g., the configurator may specify a price in response to the user specifying a quantity) (step 250). When the value of a dynamic attribute is specified or is modified, the configurator creates a partial instance of the component with a value for such dynamic attribute and associates such partial instance with a state of the configuration process. (260). When the configurator executes a constraint that involves a component with one or more dynamic attributes, the configurator uses, for each dynamic attribute, the most recent partial instance of the component with such attribute (270). For the values of static attributes of a component, the configuarator references the initial instance of the component created upon initiation of the configuration session. In other words, for the component definition, the configuration uses the initial instance of the component for the static attributes, and, for each dynamic attribute, the most recent partial instance having a value for such dynamic attribute.

Figure 3:
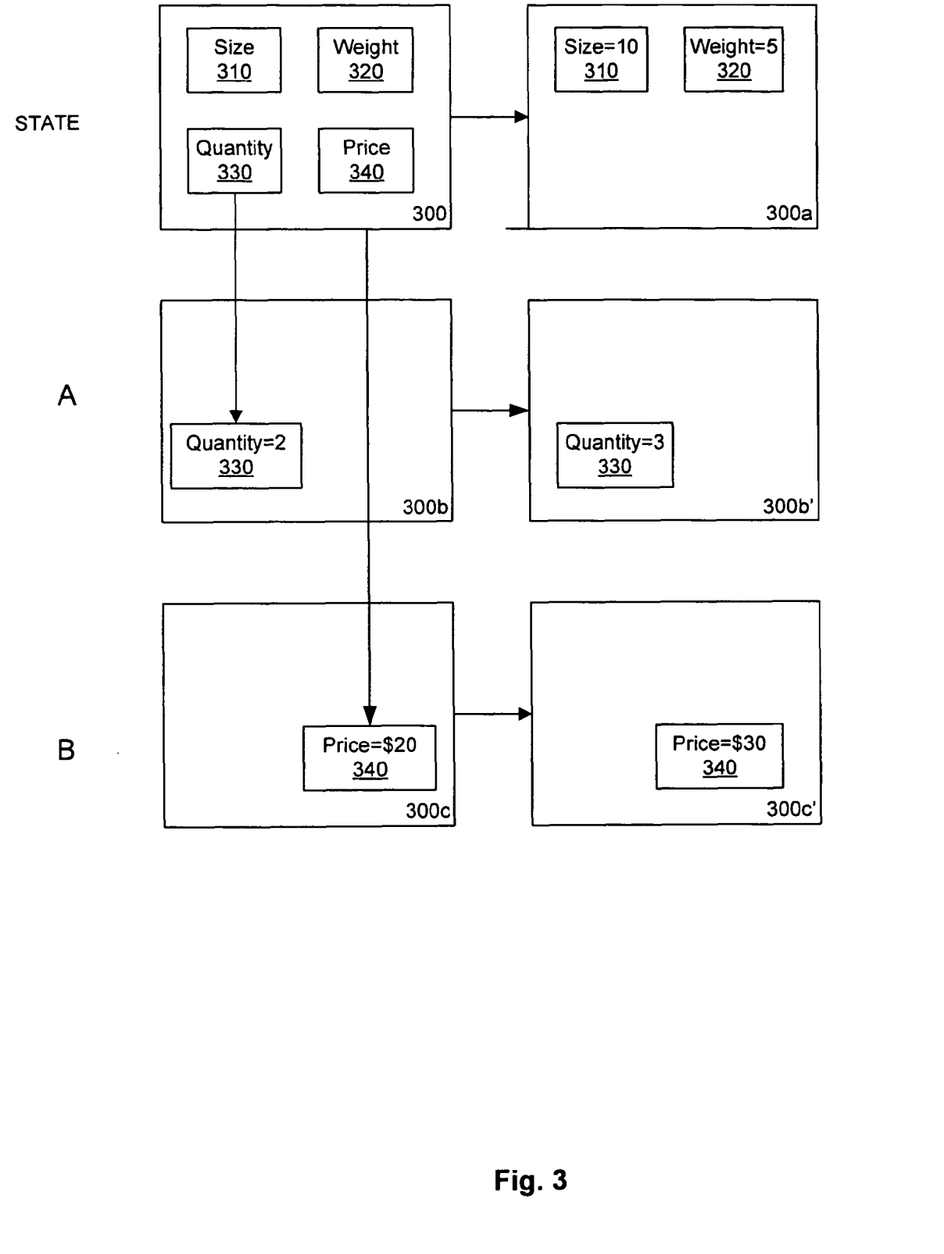
FIG. 3 is a block diagram that illustrates an example of how partial instances are generated for a component with dynamic attributes.

FIG. 3 illustrates an example of steps 260 and 270. In this example, component 300 has four attributes, size 310, weight 320, quantity 330, and price 340. Size and weight are static attributes, and quantity and price are dynamic attributes. At the initiation of the configuration process, the configurator creates an instance 300a of component 300 with values for the static attributes. At state A in the configuration process, the user specifies a value of "2" for the quantity attribute, and the configurator creates a partial instance 300b of component 300 with a quantity value of "2." The configurator associates such partial instance with State A. In response to the user specifying a quantity, the configurator automatically calculates a price, and also creates a partial instance 300c of the component with a value for price and associates such partial instance with State B.

Subsequently, the user changes the value of the quantity attribute to "3." The configurator then modifies the partial instance 300b of the component 300 with a quantity of "3" and associates such modified partial instance 300b' with revised State A. The configurator then re-computes the prices in view of the new quantity. It modifies partial instance 300c to reflect the new quantity and associates such modified partial instance 300c' with revised State B.

If the configurator then executes a constraint that involves component 300, it uses partial instances 300a, 300b', and 300c' for the component definition. Associating a state with a partial instance of the component enhances efficiency. This is because, when a user returns to an earlier configuration state and makes a change to a dynamic quantity, the configurator need only re-compute steps associated with affected, subsequent states. Creating only a partial instance of a component, instead of a whole instance, every time a dynamic attribute is specified provides for an efficient use of memory.

Figure 4:
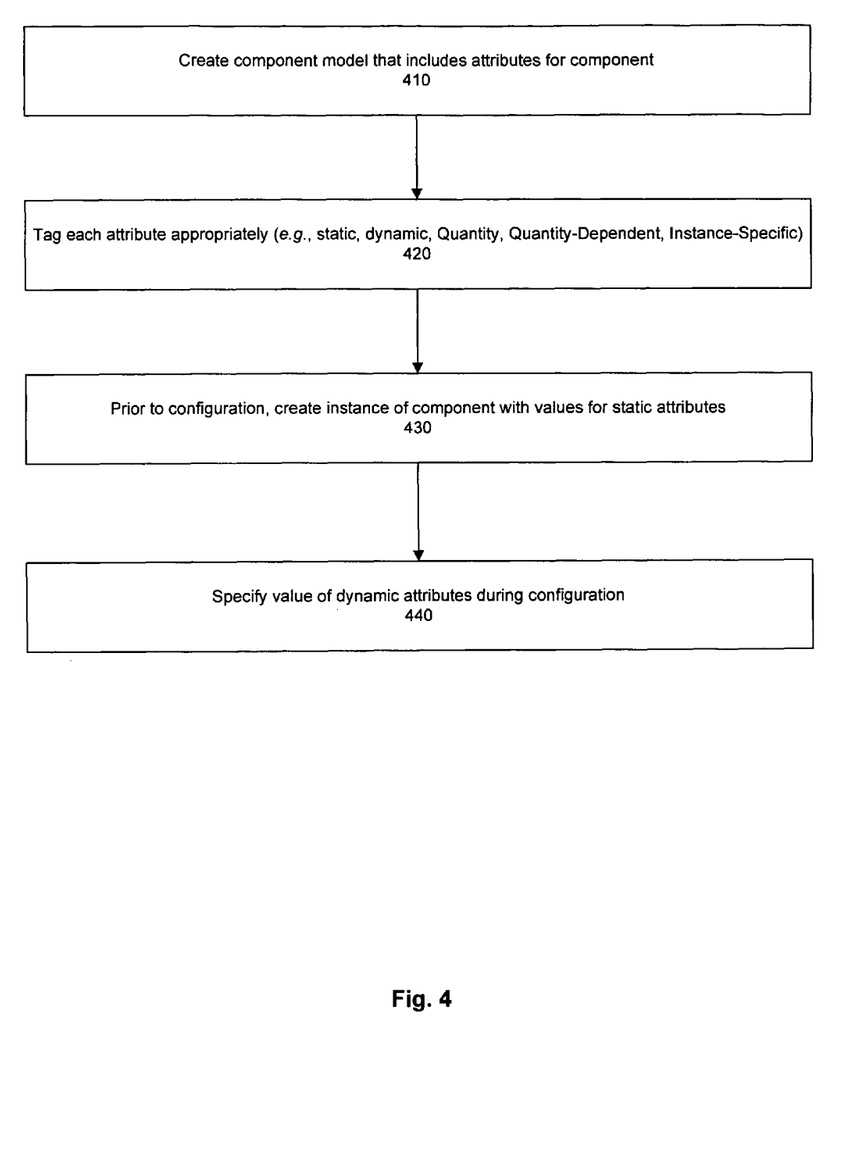
FIG. 4 is a flowchart that illustrates a method for defining components with dynamic attributes.

FIG. 4 illustrates a method for creating a component definition for a component with both dynamic and static attributes. The developer creates a component model that includes attributes of the component (step 410). The component then "tags" each attribute appropriately (step 420). Types of tags may include, but are not limited to:

Static: Static attributes are fixed and do not change. Values of static attributes are specified prior to configuration during model definition. Values of static attributes are shared across configuration sessions.

Dynamic: Values for dynamic attributes are specified during a configuration session and are specific to a configuration session.

Quantity: This tag is used for when quantity is a dynamic attribute. An attribute tagged as "Quantity" affects Quantity-Dependent attributes (described below).

Quantity-Dependent: Quantity-Dependent attributes are a type of dynamic attribute. These attribute have an initial, per-instance value. During a configuration session, the configuration automatically multiplies the per-instance value by the quantity value, once the quantity value is specified. Price and power consumption are examples of attributes that are often quantity-dependent.

Instance-specific: An instance-specific attribute is a type of dynamic attribute. An instance-specific attribute can have a separate value for each instance of the component in the product. Therefore, the number of values that an instance-specific attribute has depends on the value of the Quantity attribute. In one embodiment, the values associated with an instance-specific attribute can be stored in an array (see for example, FIG. 5b). A specific value can be referenced by the row number of the array. For example, "attribute_name@1" would return the value of the attribute in row 1 in the array.

After the user creates a component model and tags the attributes, the configurator creates an instance of the component with values for the static attributes (step 430). This is done prior to configuration, when an instance of the product model is created. Values of dynamic attributes are specified during configuration (step 440).

Figure 5A:
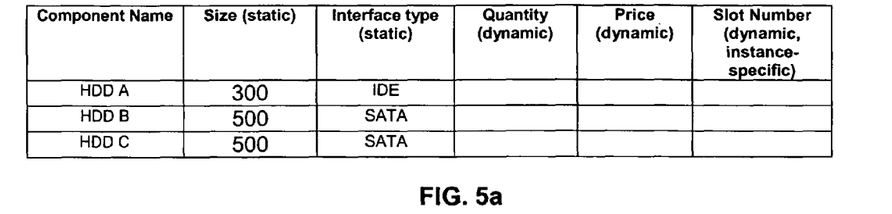
FIGS. 5a-b illustrate an example component definition.

FIG. 5a illustrates an example of component definitions. In this example, the product can include three different types of hard drive components: HDD A, HDD B, and HDD C. Each of these components is defined as having the following attributes: Size, Interface Type, Quantity, Price, and Slot Number. Size and Interface Type are tagged as static attributes, and these are specified prior to configuration. Quantity, Price, and Slot Number are tagged as dynamic attributes that are specified during configuration. Price is also tagged as Quantity-Dependent with a per-instance value of $100. Although the per-instance value of $100 is fixed and defined prior to configuration, price is a dynamic attribute because the total price is dependent on the quantity selected during configuration. Slot Number is tagged as an Instance-Specific attribute.

Figure 5B:
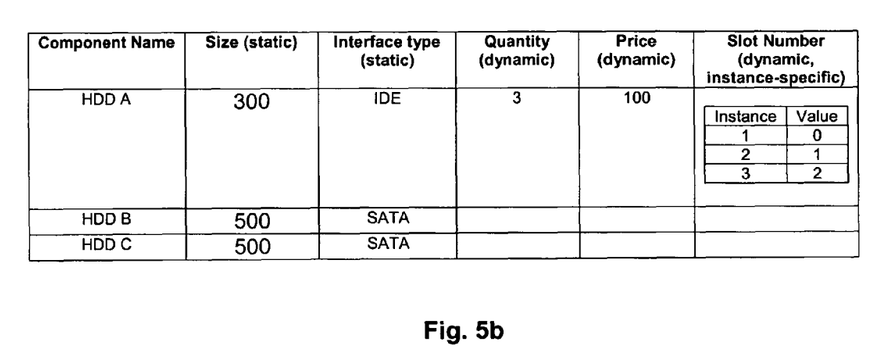
Figure 6A:
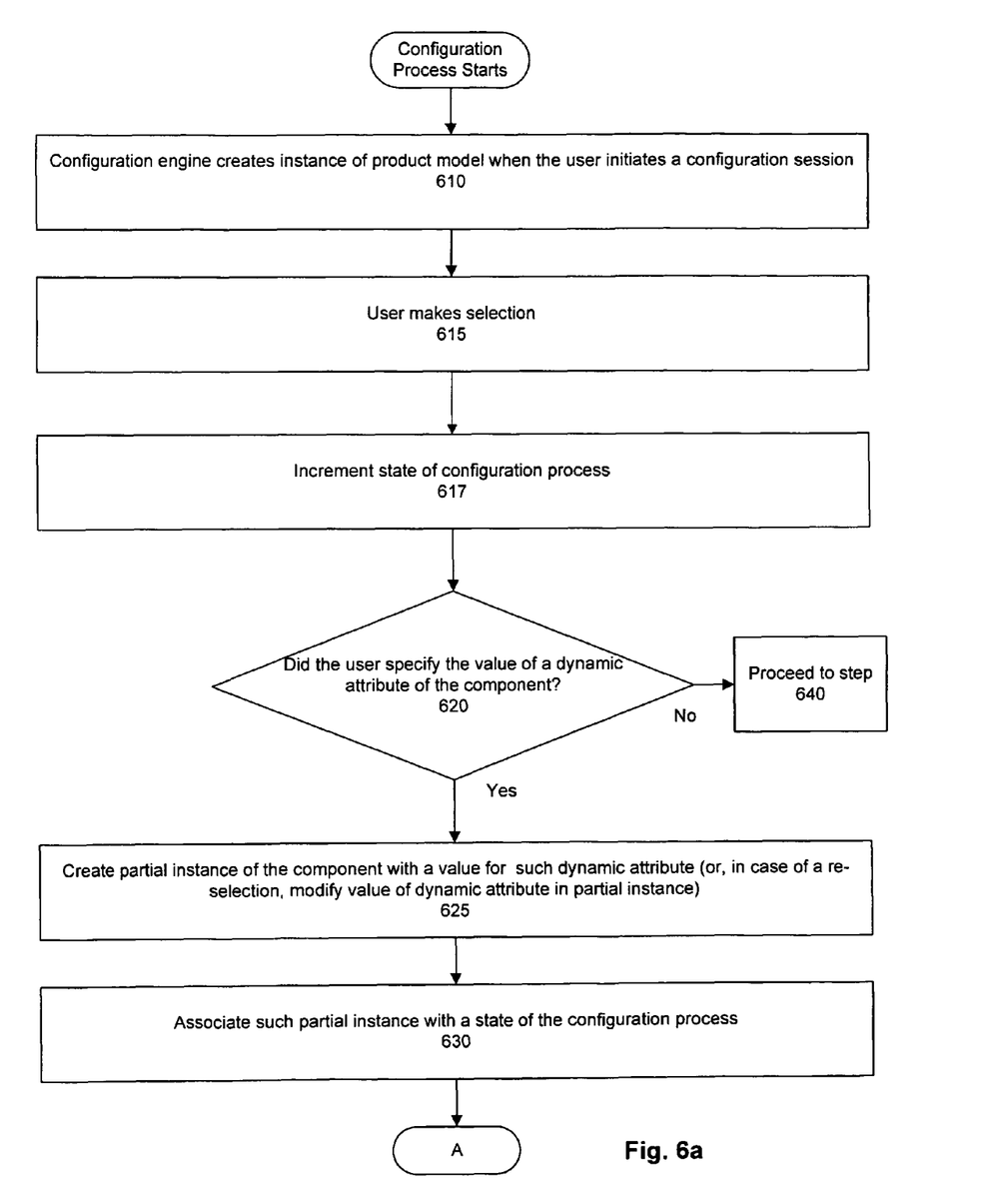
FIGS. 6a-6d is a flowchart that illustrates the operation of the configurator in configuring a product with dynamic components
Figure 6B:
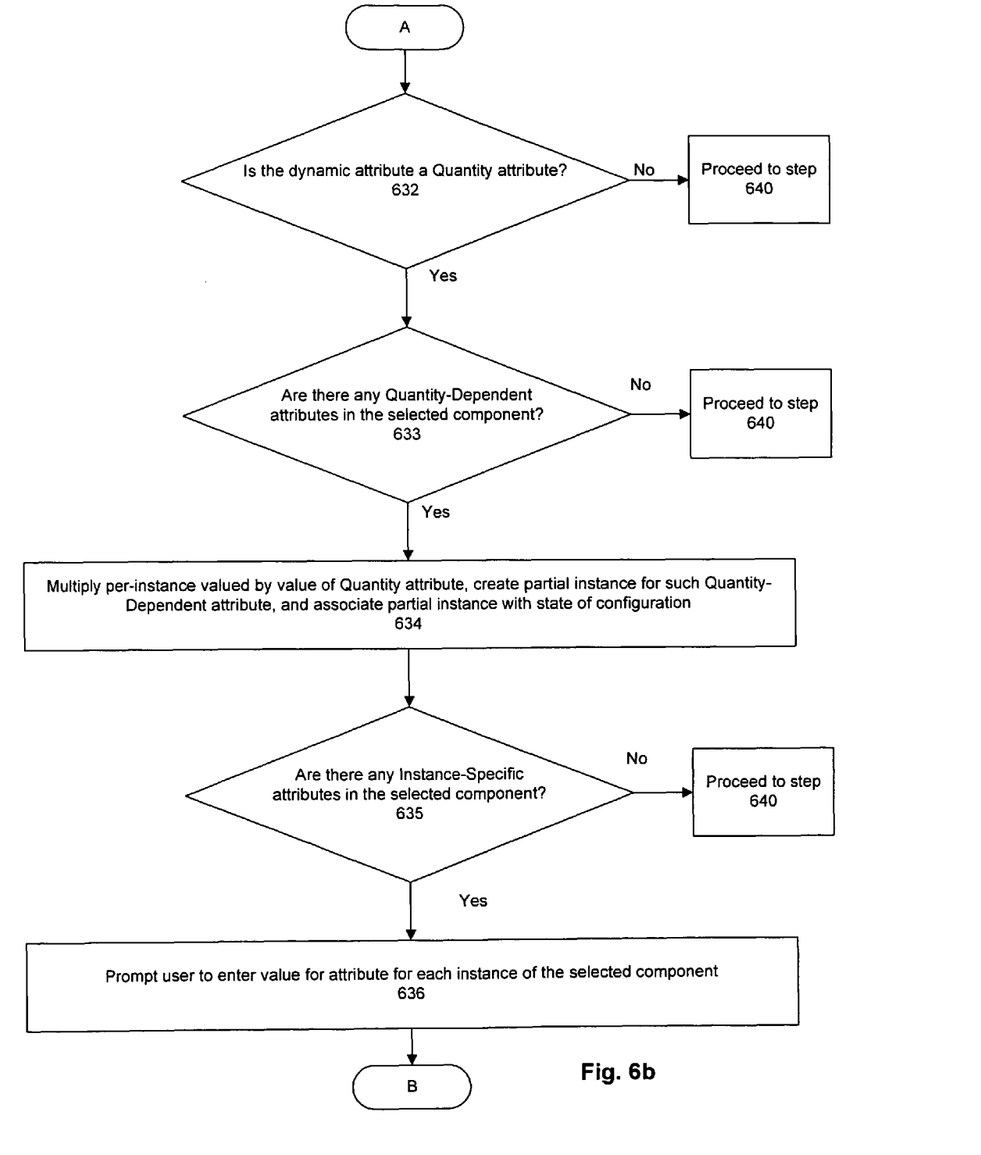
Figure 6C:
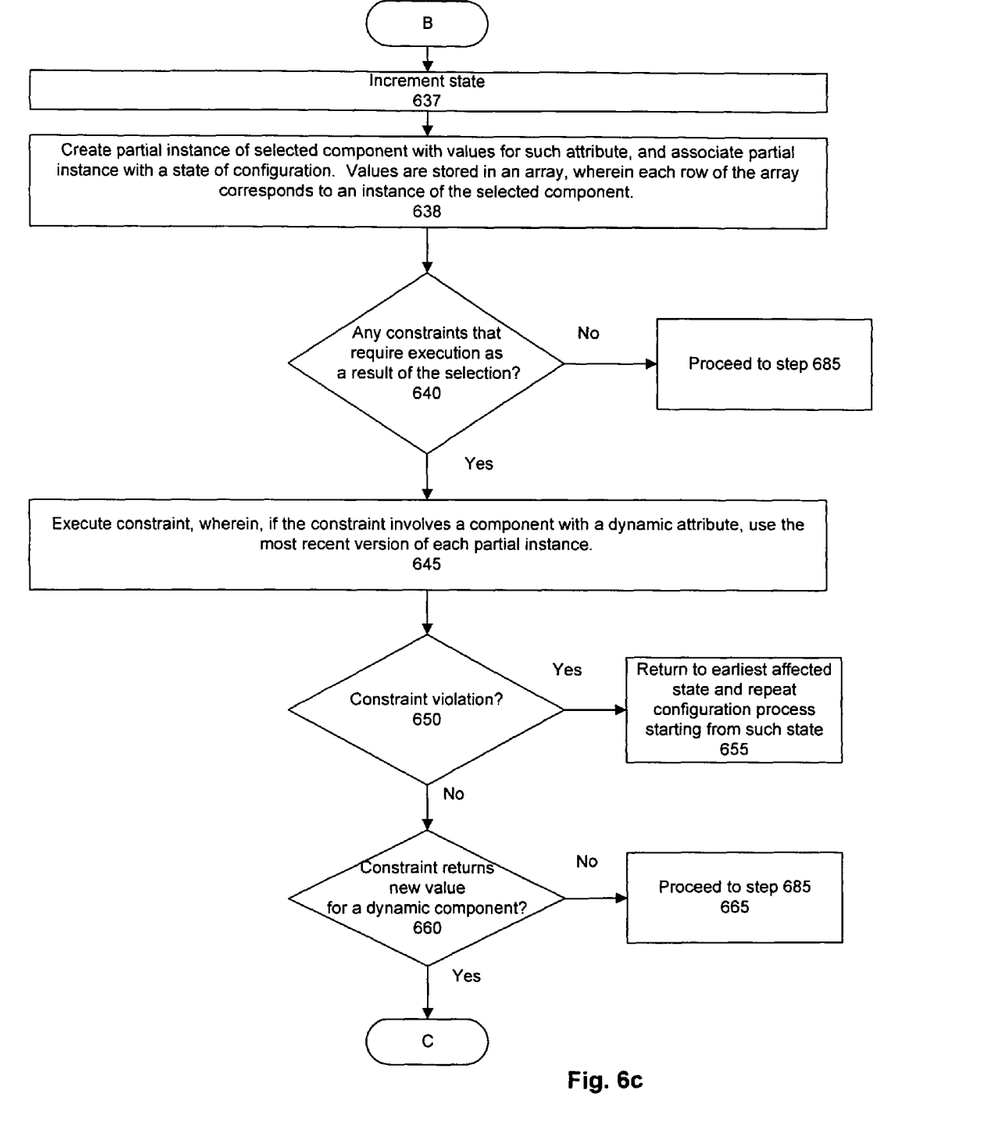
Figure 6D:
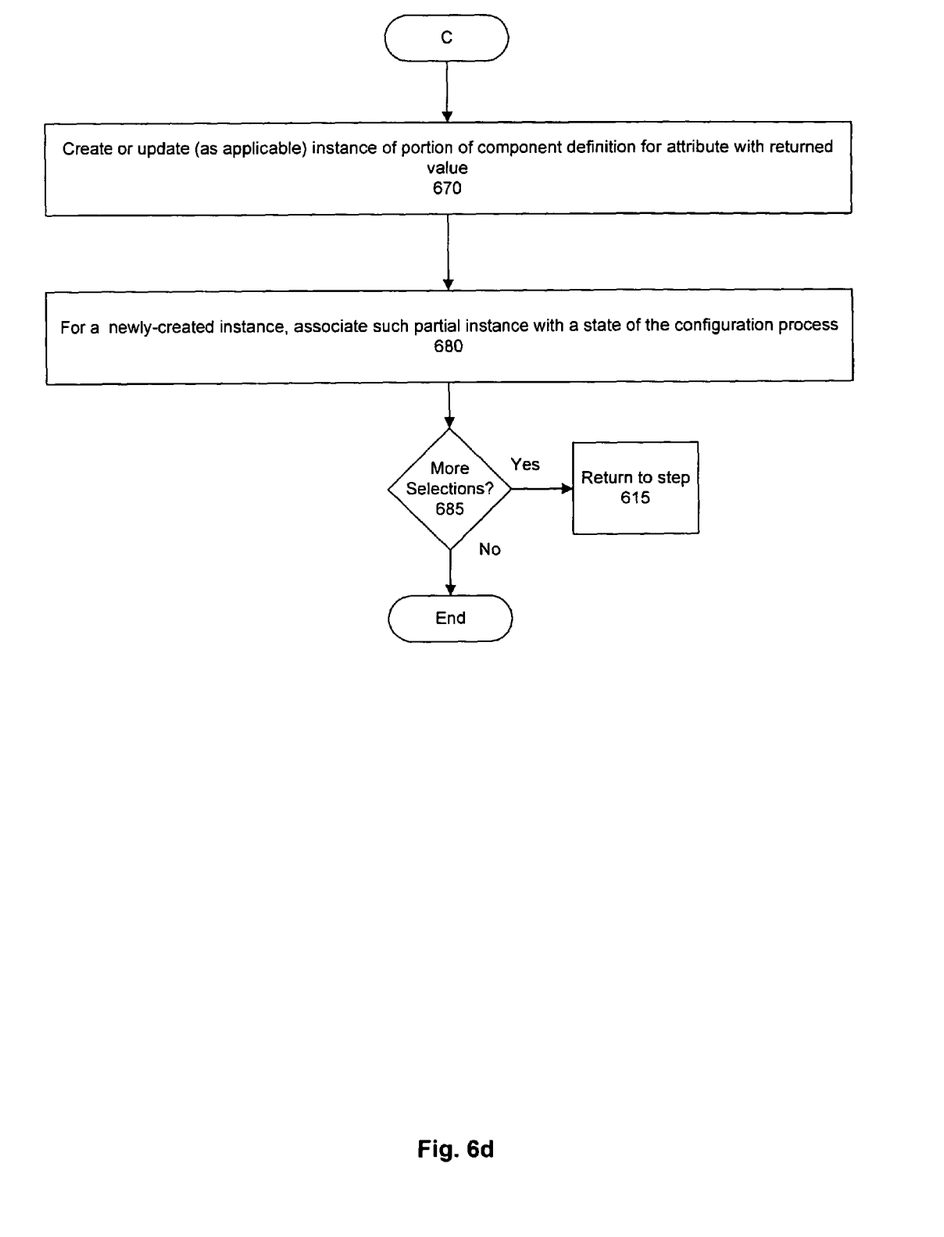

FIG. 5b illustrates an example of the definitions during a configuration. In this example, the user has selected HDD A with a quantity of "3". The configurator automatically multiplies the per-disk cost of $100 by 3 to obtain a total price of $300 for HDD A. The configurator also allows the user to assign different values for the slot numbers (i.e., 0, 1, and 2), as it was defined as an instance-specific attribute and there are three instances (quantity=3) of HDD A. The values for Slot Number are stored in an array. The particular value for Slot Number for an instance of the component can be accessed by referencing the applicable row (or column, if the array is flipped) in the array corresponding to such instance. For example, to obtain the value of the Slot Number associated with the second instance of HDD 4 (which is in the second row), one could specify "Slot_Number@2", where Slot_Number@2=1 in this example. Similarly, SlotNumber@1=0, and Slot_Number@3=2.

FIG. 6 illustrates the operation of a configurator in configuring a product with dynamic components according to one embodiment of the invention. The order of some of the steps illustrated in FIG. 6 can vary, and the invention is not limited to this order.

Referring to FIG. 6, the configurator creates an instance of the product model in response to a user initiating a configuration session (step 610). During the configuration session, the user selects a component for the product (step 615), and the configurator then increments the state of the configuration process (step 617). The configurator determines whether the user's selection involves specifying a value for a dynamic attribute of the component (step 620). If it does not, the configurator proceeds to step 640.

If the user's selection involves the user specifying a value for a dynamic attribute of the selected component, the configurator creates a partial instance of the component with the specified value for the dynamic attribute (step 625). The configurator associates such partial instance with the state of the configuration process (step 630).

If the user specified a value for a Quantity attribute, the configurator determines whether or not there any "Quantity-Dependent" attributes (as defined above) in the selected component (steps 632, 633). If there is a Quantity-Dependent attribute in the selected component, then the configurator automatically multiplies the per-instance value of such attribute by the quantity to obtain a total value for such Quantity-Dependent attribute (step 634). The configurator creates a partial instance for such attribute with the total value, and associates a state of the configuration session with such partial instance (step 634).

If the user specified a value for a Quantity attribute, the configurator also determines whether or not there any Instance-Specific attributes in the selected component (step 635). If so, the configurator prompts the user to enter a value for such attribute for each instance of the component (step 636), and increments the configuration state(s) appropriately (step 637). The configurator creates a partial instance of the component with an array of values for such attribute, and associates such partial instance with a state of the configuration process (step 638). The number of rows in the array corresponds to the number of instances of the selected component.

In step 640, the configurator determines whether or not there are any constraints that need to be executed as a result of the user's selection. If no constraints need to be executed, the configurator proceeds to step 685. Otherwise, the configurator executes the constraint(s). If the constraint involves a component with dynamic attributes, the configurator uses the most recent version of each partial instance of the component for the component definition.

If, in executing the constraint(s), the configurator determines that there is a constraint violation, the configurator returns to the earliest affected state and repeats the configuration process from such state (steps 650, 655). If there are no constraint violations, the configurator proceeds to step 660 and determines if executing the constraint returned a new value for a dynamic attribute. If a new value was returned, the configurator creates or updates (as applicable) a partial instance of the component with the new value (step 670). For a newly-created instance, the configuarator associates the new partial instance with a state of the configuration process (steps 680).

The configurator then determines if the user needs to make more selections (step 685). If further selections are required, the configurator returns to step 615 (step 695). If no further selections are required, the configuration session terminates.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method, in a configuration system, for efficiently configuring a product using dynamic components comprising:
   creating a product model for the product;
   creating component definitions for components within the product model, wherein at least one component definition includes both a static attribute and a dynamic attribute;
   specifying values for the static attributes within component definitions prior to configuring the product, wherein static attributes are shared across configuration sessions; and
   configuring the product, wherein configuring the product includes:
      specifying values for the dynamic attributes during configuration of the product, wherein values of dynamic attributes are not shared across configuration sessions;
      in response to a value of a dynamic attribute being specified, creating a partial instance of the component that includes the specified value of such dynamic attribute and no values for other attributes, and associating such partial instance with a state of configuration; and
      executing one or more constraints to determine if the product has a valid configuration, wherein, executing a constraint that involves a component with one or more dynamic attributes comprises using, for each dynamic attribute, the most recent partial instance of the component with a value for such dynamic attribute.

2. The method of claim 1, wherein at least one component definition includes a dynamic attribute for quantity.

3. The method of claim 2, wherein at least one other attribute in such component definition is a quantity-dependent attribute having a per-instance value, and, after the user specifies a value for the quantity attribute during configuration, the per-instance value of such quantity-dependent attribute is automatically multiplied by the value of the quantity attribute to obtain a total value of such quantity-dependent attribute, and wherein the total value of such quantity-dependent attribute is stored in a partial instance of the component that has no values for other attributes and that is associated with a state of configuration.

4. The method of claim 2, wherein at least one other attribute in such component definition is tagged as instance-specific, wherein an instance-specific attribute has a separate value for each instance of the component.

5. The method of claim 4, wherein the values of an instance-specific attributes are stored in an array.

6. The method of claim 4, wherein the value of an instance-specific attribute for a particular instance of such component is retrieved by referring to a row number in the array associated with such instance of the component.

7. The method of claim 4, wherein the value of an instance-specific attribute for a particular instance of such component is retrieved by referring to a column in the array associated with such instance of the component.

8. A computer program embodied on a non-transitory computer-readable medium and comprising code that, when executed by a computer system, enables the computer system to perform a method for configuring a product in a configuration system using dynamic components, the method comprising:
   creating an instance of a product model in response to a user initiating a configuration session, including creating an initial instance of each component within the product model that includes values for static attributes;
   enabling a user to specify values for dynamic attributes of the components during configuration of the product;
   in response to a user specifying a value of a dynamic attribute during configuration of the product, creating a partial instance of the component that includes the value of such dynamic attribute and no values for other attributes, and associating such partial instance with a state of configuration; and
   executing one or more constraints to determine if the product has a valid configuration, wherein
   executing a constraint that involves a component with one or more dynamic attributes comprises using, for each dynamic attribute, the most recent partial instance of the component with a value for such dynamic attribute, and using the initial instance of the component for values of static attributes.

9. The computer program of claim 8, wherein at least one component includes a dynamic attribute for quantity.

10. The computer program of claim 9, wherein at least one other attribute in such component is a quantity-dependent attribute having a per-instance value, and the method further comprises:
    in response to the user specifying a value for the quantity attribute of such component, automatically multiplying the per-instance value of the quantity-dependent attribute by the value of the quantity attribute to obtain a total value for the quantity-dependent attribute;
    creating a partial instance of the component that includes the total value of such quantity-dependent attribute and no values for other attributes: and
    associating such partial instance with a state of configuration.

11. The computer program of claim 9, wherein at least one other attribute in such component is tagged as instance-specific, wherein the method further comprises:
    enabling a user to enter a separate value for the instance-specific attribute for each instance of such component.

12. The computer program of claim 11, wherein the partial instance created for the instance-specific attribute includes an array that stores the values of the instance-specific attribute for each instance of such component.

13. The computer program of claim 12, wherein the value of an instance-specific attribute for a particular instance of such component is retrieved by referring to a row number in the array associated with such instance of such component.

14. The computer program of claim 12, wherein the value of an instance-specific attribute for a particular instance of such component is retrieved by referring to a column in the array associated with such instance of such component.

15. A method for configuring a product in a configuration system using dynamic components, the method comprising:
    creating an instance of a product model in response to a user initiating a configuration session, including creating an initial instance of each component within the product model that includes values for static attributes;
    enabling a user to specify values for dynamic attributes of the components during configuration of the product;
    in response to a user specifying a value of a dynamic attribute during configuration of the product, creating a partial instance of the component that includes the value of such dynamic attribute and associating such partial instance with a state of configuration; and executing one or more constraints to determine if the product has a valid configuration, wherein executing a constraint that involves a component with one or more dynamic attributes, comprises using, for each dynamic attribute, the most recent partial instance of the component with a value for such dynamic attribute, and using the initial instance of the component for values of static attributes.

16. The method of claim 15, wherein at least one component includes a dynamic attribute for quantity.

17. The method of claim 16, wherein at least one other attribute in such component is a quantity-dependent attribute having a per-instance value, and the method further comprises:

in response to the user specifying a value for the quantity attribute of such component, automatically multiplying the per-instance value of the quantity-dependent attribute by the value of the quantity attribute to obtain a total value for the quantity-dependent attribute;

creating a partial instance of the component that includes the total value of such quantity-dependent attribute and no values for other attributes: and associating such partial instance with a state of configuration.

18. The method of claim 16, wherein at least one other attribute in such component is tagged as instance-specific, wherein the method further comprises:

enabling a user to enter a separate value for the instance-specific attribute for each instance of such component.

19. The method of claim 18, wherein the partial instance created for the instance-specific attribute includes an array that stores the values of the instance-specific attribute for each instance of such component.

* * * * *